UNITED STATES PATENT OFFICE.

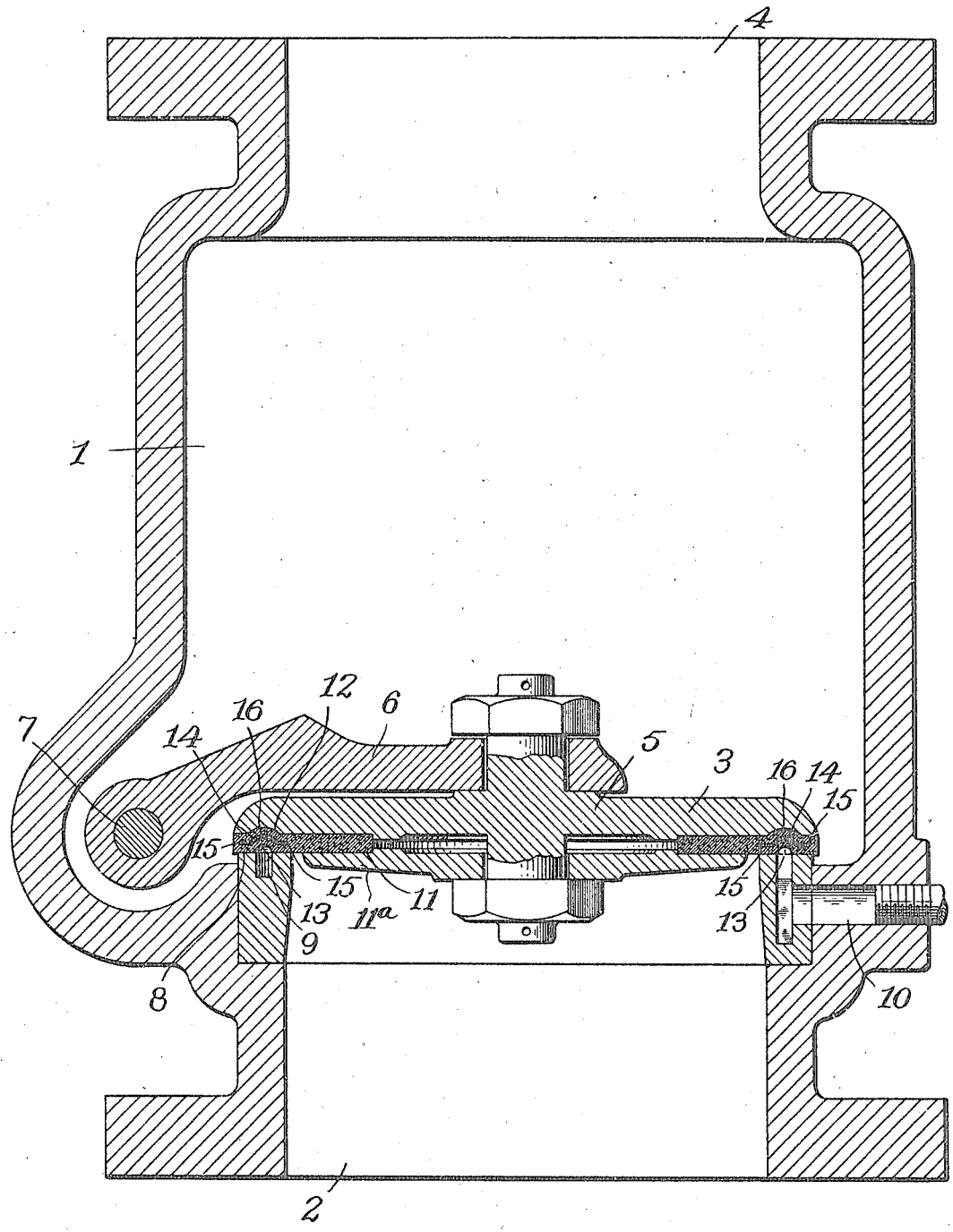

JOHN P. ASHEY, OF WORCESTER, MASSACHUSETTS.

CHECK-VALVE FOR SPRINKLER SYSTEMS.

1,185,041. Specification of Letters Patent. Patented May 30, 1916.

Application filed March 17, 1915. Serial No. 15,006.

*To all whom it may concern:*

Be it known that I, JOHN P. ASHEY, a citizen of the United States, residing at Worcester, in the county of Worcester and Commonwealth of Massachusetts, have invented a new and useful Improvement in Check-Valves for Sprinkler Systems, of which the following is a specification, accompanied by a drawing forming a part of the same.

My invention relates to the check valves employed in sprinkler systems to normally shut off the flow of water to the sprinkler heads until the same are thermally released, and it consists in the construction and arrangement of parts as hereinafter described, the novel features being pointed out in the annexed claims.

Referring to the accompanying drawing 1 denotes a chamber forming a part of the circulatory system by which water under pressure is supplied to the sprinkler heads. The chamber 1 has an inlet 2 normally closed by the check valve 3, and an outlet opening 4 communicating with the pipes upon which the sprinkler heads are mounted. The check valve 3 consists of a metallic disk 5, which in the present instance is connected with a swinging arm 6 pivoted at 7 in the casing of the chamber 1. The check valve 3 is seated upon a valve seat 8 provided with an annular groove 9 which communicates with a pipe 10 leading to an alarm apparatus which forms no part of my present invention, and is therefore not herein described or illustrated.

In the operation of the alarm system when the check valve 3 is opened by the release of pressure caused by the opening of a sprinkler head, water flows into the annular groove 9 and through the pipe 10 to actuate the alarm system, in the manner commonly practised.

In order to effect a secure closure by the check valve a gasket 11 is interposed between the disk 5 and the valve seat 8, and securely clamped in position by a disk 11ª. The gasket is preferably constructed of some slightly compressible or resilient material which under pressure fits itself to the surface of the valve seat, thereby securing a tight joint. The continued pressure exerted upon the top of the check valve is liable in practice to crowd a flat gasket of the ordinary type into the annular groove 9. When this pressure has been continued for a considerable period, the gasket is liable to become molded to the shape of the groove and tends to retard the quick and certain opening of the check valve upon a slight release of pressure, such for example as would be caused by the opening of a single sprinkler head. A slight lifting of the check valve, such as might occur by the release of a single sprinkler head might also fail to clear the annular groove 9 sufficiently to permit a full flow of water into the groove, thereby delaying the operation of the alarm system. In order to prevent this result I form a recess 12 in the under side of the disk 5 and opposite the annular groove 9. I mold the gasket 11 to fill the recess 12 forming upon the under side of the gasket a small groove 13. This raises an annular section of the gasket and gives substantially an arched effect to the gasket at the point where it spans the annular groove, thereby resisting the downward pressure exerted upon the gasket. In order to give greater rigidity to the raised section thus formed in the gasket, I insert an annular metal strip 14 having its opposite edges flat, as shown at 15, 15, with its central portion arched or raised at 16 to correspond with the raised section of the gasket.

I claim,

1. A check valve of the class described, comprising a valve seat having an annular groove, a metallic disk covering the valve seat and provided with a recess opposite the groove in the valve seat, and a gasket interposed between said disk and the valve seat, having an annular arched section between the groove in the valve seat and the recess in said disk.

2. A check valve of the class described, comprising a valve seat having an annular groove, a metallic disk covering the valve seat and an interposed gasket provided with an annular substantially arched section corresponding with the groove in the valve seat.

3. A check valve of the class described, comprising a valve seat having an annular groove, a metallic disk covering the valve seat, and an interposed gasket provided with a groove upon the under side of the gasket registering, when the valve is closed, with the groove in the valve seat.

4. A check valve of the class described, comprising a valve seat having an annular groove, a metallic disk covering the valve seat, an interposed gasket having an annular section raised corresponding with the groove in the valve seat, and a reinforcing strip inserted in said raised section.

5. A check valve of the class described, comprising a valve seat having an annular groove in its face, a metallic disk covering the valve seat provided with a recess in its under side opposite the groove in the valve seat, and a gasket interposed between the disk and valve seat, having an annular raised section extending into said recess.

JOHN P. ASHEY.

Witnesses:
 NELLIE WHALEN,
 PENELOPE COMBERBACH.